R. NEWCOMB.
HAY SHOCKER.
APPLICATION FILED FEB. 14, 1918.
1,318,296.
Patented Oct. 7, 1919.
3 SHEETS—SHEET 1.
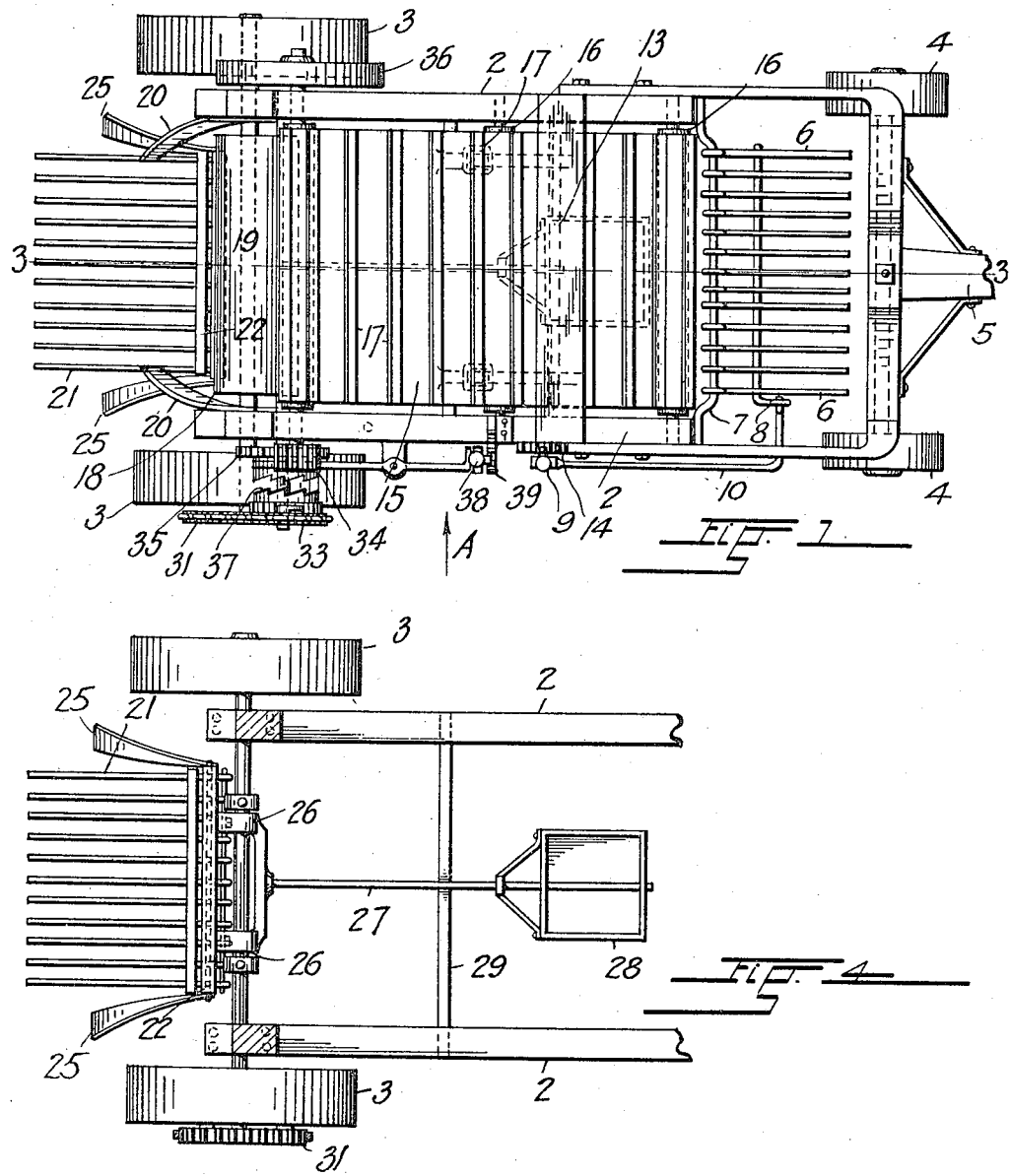
INVENTOR
RICHARD NEWCOMB.
BY
ATTORNEY

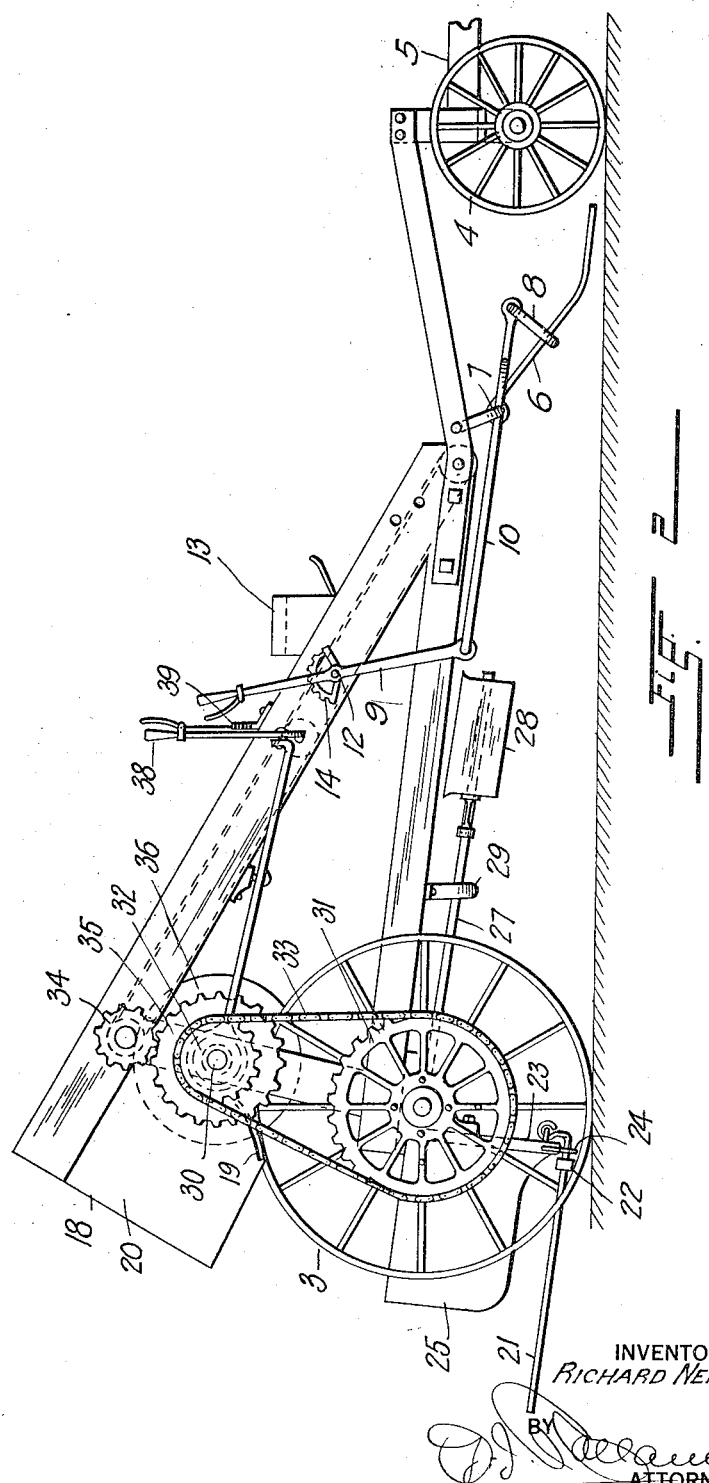

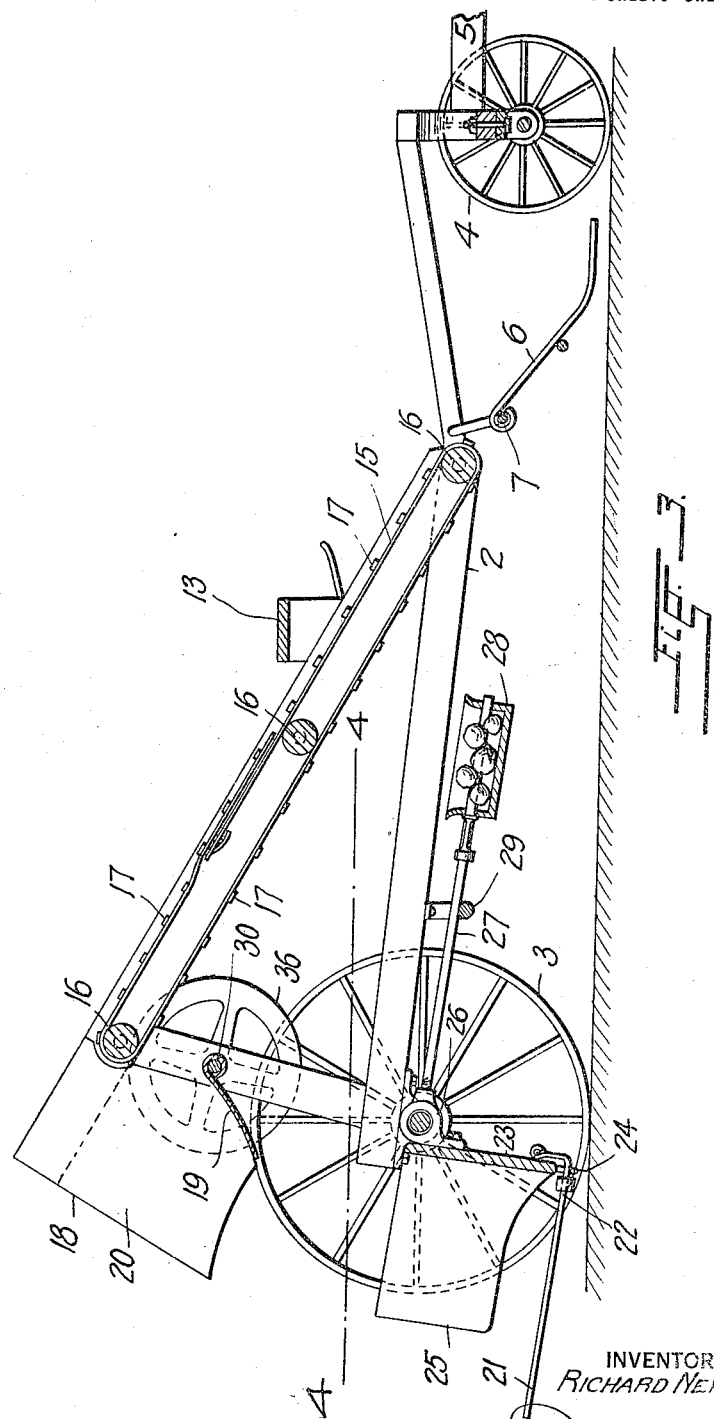

UNITED STATES PATENT OFFICE.

RICHARD NEWCOMB, OF DENVER, COLORADO.

HAY-SHOCKER.

1,318,296.        Specification of Letters Patent.        Patented Oct. 7, 1919.

Application filed February 14, 1918. Serial No. 217,073.

*To all whom it may concern:*

Be it known that I, RICHARD NEWCOMB, a citizen of the United States, residing at Denver, in the county of Denver and State of Colorado, have invented certain new and useful Improvements in Hay-Shockers, of which the following is a specification.

This invention relates to hay shockers, and its object is to provide a wheel-supported machine of simple construction which gathers mown hay, corn or other forage from a harvest field over which it is propelled, and deposits it upon the field in shocks of substantially uniform weight and size.

With this and other objects in view, all of which will fully appear in the course of the following description, my invention consists in the features of construction, arrangements of parts and combinations of devices shown in the accompanying drawings in which like reference characters designate corresponding parts throughout the various views and in which, Figure 1 is a plan view of my improved shocker, Fig. 2, a side elevation of the same, looking in the direction of the arrow A, in Fig. 1, and drawn to an enlarged scale, Fig. 3, an enlarged longitudinal section taken along the line 3—3, Fig. 1, and Fig. 4, a horizontal section on the line 4—4, Fig. 3.

Referring more specifically to the drawings, the reference numeral 2 designates the frame of the shocker which is supported at its rear end upon traction wheels and at its forward end upon a swiveled truck 4 to which the tongue 5 is attached.

The frame carries at its front end, rearward of the truck, a rake 6 which is pivoted, as at 7, for up and down movement and which has an upwardly projecting arm 8 for its connection with an adjusting lever 9 through the intermediary of a rod 10.

The lever which is fulcrumed at 12 on a side of the machine, within easy reach of a driver occupying a seat 13, is held in its adjusted positions by the engagement of the usual hand-operated pawl with a toothed segment 14 and it serves in the operation of the machine to adjust the rake to any desired elevation above the surface of the ground and to hold it in its operative position.

The rake which gathers the hay from the field over which the machine is propelled, delivers it onto the lower portion of an inclined endless belt conveyer 15 which is movably supported upon parallel rollers 16.

The belt is provided with equidistantly arranged transverse slats 17 by means of which it carries the hay delivered from the rake, to an elevated point of discharge.

The discharged hay falls over the upper end of the conveyer into a chute 18 which consists of a downwardly flaring bottom plate 19 and two converging side-plates 20, of resilient material.

The bottom-plate curves upwardly at its outer edge in order to cause the hay discharged from the chute to move forwardly to a point directly above the element of my invention which collects the hay and discharges it onto the ground as will hereinafter be more fully described.

The hay continuously fed from the conveyer into the chute, moves gradually downward between its converging sides and by the inherent resiliency thereof is gathered into a pack until it is of sufficient compactness and weight to spread the sides when it moves forwardly across the up-curved edge of the bottom plate and falls upon the collecting element which automatically deposits the hay upon the field after a number of the packs have been aggregated into a shock of predetermined size and weight.

The collecting element consists of a platform 21 composed of a number of parallel bars which are connected at their forward ends by a transverse member 22.

The platform is pivotally attached at the lower end of a back-plate 23 and is normally held at right angles thereto upon a subjacent support 24.

A pair of upwardly flaring guide plates 25 extending rearwardly from the opposite upright edges of the back-plate serve to direct the packs of hay delivered through the chute 18 onto the platform 21, and the entire collector thus constructed is fulcrumed for up and downward movement, upon the axle of the traction-wheels by means of rearwardly extending lugs 26.

A lever-arm 27 extending forwardly from the lugs of the collector underneath the portion of the frame of the machine upon which the conveyer and the chute are mounted, carries an adjustable weight 28 which counterbalances the load supported upon the platform.

The weight consists in its preferred form of an open box which is shiftably suspended from the lever-arm and which can be filled with rocks, sand or other suitable objects or material.

It will be readily seen that by this means any desired quantity of hay or other forage supported upon the platform may be balanced by the weight connected with the arm 27, through the simple medium of shifting the box along the arm or of increasing or diminishing its contents.

When the platform is empty, it is held in a slightly tilting position by the overbalancing weight on the lever-arm whose downward movement is limited by a stop-rod 29 fastened to the frame of the machine.

The conveyer is driven from one of the traction-wheels through the intervention of a counter-shaft 30 which is connected with the traction-wheel by means of sprocket-wheels 31 and 32 and a corresponding chain 33.

The uppermost roller of the conveyer is connected with the countershaft by means of a pair of meshing gear-wheels 34 and 35 and a fly-wheel 36 at the opposite end of the shaft assists in securing a uniform movement of the operating parts.

The sprocket-wheel 35 is preferably loosely mounted on the shaft 30 and a clutch 37 is provided to secure or discontinue its rotative continuity with the shaft.

The moving clutch-member is connected with a shift-lever 38 which is fulcrumed in adjacency to the driver's seat and which as usual carries an adjustable pawl in coöperation with a toothed segment 39 to lock it in its adjusted positions.

In the operation of the shocker, the machine is pulled over a field of mown hay or other forage by draft animals hitched onto the tongue of the pivoted truck, or by a traction engine connected with the truck by any suitable means.

The rake after having been adjusted to the proper distance above the surface of the ground, gathers the hay and delivers it upon the lower portion of the upwardly moving upper side of the inclined endless conveyer. The hay is discharged from the conveyer across the upper end thereof and passes into the chute in which it is compacted between the converging side plates which as stated before have a slight degree of inherent resiliency.

The compacted bodies of hay moving forwardly across the up-curved end of the bottom plate of the chute to a point above the collector, fall between the flaring side-plates 25 upon the longitudinally slotted platform which normally is overbalanced by the weight of the lever-arm 27 resting upon the stop-bar 29.

As the bodies of hay discharged through the chute accumulate upon the platform they gradually overbalance the weight on the lever-arm thereby compelling the platform to move downwardly until the stubbles of the hay-stalks which cover the harvest field, project through the slots of the platform and engage its load.

During farther forward movement of the machine the load is held by the stubbles projecting through the slots of the platform and thus cause the latter to move from below the same.

In this manner the gathered hay is deposited upon the field in shocks of uniform size and weight. The subsequent work of loading the shocks onto the haystacks is thereby greatly facilitated and the harvest is accomplished more thoroughly and in but a small part of the time required to shock the hay by manual labor.

The machine is particularly adapted to gather the hay after it has been left upon the field in swaths by the mowing machines employed in cutting it and it is entirely automatic in its operation.

The pivotal connection of the slotted platform of the collector is a safeguard against breakage or damage by rocks or other obstructions encountered in the field over which the machine is drawn, and the shiftable and the regulatable weight on the lever-arm of the collector provides a ready means for regulating the size and the weight of the shocks produced in the operation of the machine.

I desire it understood that while I have shown and described by improved shocker in the best form at present known to me, variations in the arrangement and constructions of its parts, other than those above referred to may be resorted to within the spirit of my invention as defined in the following claims:

1. In a hay-stacker, a carriage, a conveyer thereon, a lever fulcrumed for up and down movement, a counterweight acting upon the lever at one side of its fulcrum, and a slotted platform on the lever at the oposite side of the same and disposed on the carriage to receive hay discharged from the conveyer and to discharge it by engagement with stubbles on a field over which the carriage moves after its load has overbalanced the weight, the platform having a limited up and down movement on the lever to permit of its passing over obstructions on the field without disturbing the position of the lever.

2. In a hay-stacker, the combination of a carriage, a conveyer, a chute disposed to receive the hay discharged from the conveyer, composed of normally converging resilient sides and a downwardly slanting, slightly upturned bottom between the same, and a platform disposed to receive packs of hay moving across the edge of the bottom, the platform being fulcrumed and counterbalanced to automatically discharge a load by gravitation, onto a field over which the carriage moves.

3. In a hay-stacker, the combination of a carriage, a conveyer, a chute disposed to receive the hay discharged from the conveyer, composed of normally converging resilient sides and a downwardly slanting, slightly upturned bottom between the same, and a platform disposed to receive packs of hay moving across the edge of the bottom, and having sides between which the packs collect in stacked formation, the platform being fulcrumed and counterbalanced to automatically deliver a load by gravitation, onto a field over which the carriage moves.

In testimony whereof I have affixed my signature in presence of two witnesses.

RICHARD NEWCOMB.

Witnesses:
 G. J. ROLLANDET,
 L. RHOADES.

Copies of this patent may be obtained for five cents each, by addressing the "Commissioner of Patents, Washington, D. C."